United States Patent
El Assaad

(10) Patent No.: US 10,684,352 B2
(45) Date of Patent: Jun. 16, 2020

(54) METHOD FOR CARRYING OUT DISTANCE MEASUREMENTS BETWEEN THE TRANSPORTATION VEHICLES OF A VEHICLE CONVOY AND TRANSPORTATION VEHICLE MODULE FOR USE IN THE METHOD AND TRANSPORTATION VEHICLE

(71) Applicant: VOLKSWAGEN AKTIENGESELLSCHAFT, Wolfsburg (DE)

(72) Inventor: Ahmad El Assaad, Wolfsburg (DE)

(73) Assignee: VOLKSWAGEN AKTIENGESELLSCHAFT (DE)

(*) Notice: Subject to any disclaimer, the term of this patent is extended or adjusted under 35 U.S.C. 154(b) by 0 days.

(21) Appl. No.: 16/212,066

(22) Filed: Dec. 6, 2018

(65) Prior Publication Data

US 2019/0195982 A1  Jun. 27, 2019

(30) Foreign Application Priority Data

Dec. 7, 2017 (DE) .................. 10 2017 222 216

(51) Int. Cl.
*G08G 1/00* (2006.01)
*G01S 5/14* (2006.01)
(Continued)

(52) U.S. Cl.
CPC .............. *G01S 5/14* (2013.01); *G01S 5/0289* (2013.01); *G01S 13/0209* (2013.01);
(Continued)

(58) Field of Classification Search
CPC ...... G01S 5/14; G01S 5/0289; G01S 13/0209; G01S 13/931; G01S 19/03;
(Continued)

(56) References Cited

U.S. PATENT DOCUMENTS 7,102,537 B2   9/2006 Inoue et al.
8,514,825 B1 *  8/2013 Addepalli ......... H04W 72/0406
                                                            370/338
(Continued)

FOREIGN PATENT DOCUMENTS

SE         1650608 A1    3/2017
WO    2007133264 A2   11/2007
(Continued)

OTHER PUBLICATIONS

Srujan; Ultra-wide Band for Vehicle Platooning; Master Thesis; Eindhoven University of Technology; Aug. 2016.

*Primary Examiner* — Nay Tun
(74) *Attorney, Agent, or Firm* — Barnes & Thornburg LLP

(57) ABSTRACT

A method of high-density platooning for transporting goods or persons wherein a group of transportation vehicles drives close behind each other as a convoy, wherein the distances between the transportation vehicles of the convoy are controlled automatically to reduce the energy consumption. An efficient distance measurement method carries out distance measurements between the transportation vehicles of the convoy. A method of UWB ranging, corresponding to Ultra-Wide Band ranging, is used for distance measurement. The coordination of the time sequence of the individual distance measurements between each two transportation vehicles of the convoy is provided so a planned time is assigned to each individual distance measurement to be carried out starting from the coordination event.

18 Claims, 3 Drawing Sheets

(51) Int. Cl.
- *G01S 13/931* (2020.01)
- *G01S 5/02* (2010.01)
- *G01S 13/02* (2006.01)
- *G01S 19/03* (2010.01)
- *G05D 1/02* (2020.01)

(52) U.S. Cl.
CPC ............ *G01S 13/931* (2013.01); *G01S 19/03* (2013.01); *G05D 1/0293* (2013.01); *G08G 1/22* (2013.01); *G01S 2013/9316* (2020.01); *G01S 2013/9325* (2013.01); *G01S 2013/9329* (2020.01)

(58) Field of Classification Search
CPC ..... G01S 2013/9325; G01S 2013/9339; G01S 2013/936; G05D 1/0293; G08G 1/22
See application file for complete search history.

(56) References Cited

U.S. PATENT DOCUMENTS

| | | |
|---|---|---|
| 9,390,451 B1 | 7/2016 | Slusar |
| 2004/0193372 A1 | 9/2004 | MacNeille et al. |
| 2007/0164896 A1* | 7/2007 | Suzuki ................... G01S 7/006 342/70 |
| 2009/0118889 A1* | 5/2009 | Heino ..................... B62D 1/28 701/24 |
| 2009/0167513 A1* | 7/2009 | Hill ....................... G01S 5/0072 340/435 |
| 2010/0231435 A1* | 9/2010 | Zhen .................... G01S 13/765 342/47 |
| 2011/0270514 A1* | 11/2011 | Shida ................... B60W 30/16 701/117 |
| 2012/0095673 A1* | 4/2012 | Choi ................ B60W 30/0956 701/300 |
| 2013/0116861 A1* | 5/2013 | Nemoto ............... B60W 30/16 701/2 |
| 2013/0211624 A1* | 8/2013 | Lind ................... G05D 1/0278 701/2 |
| 2015/0269845 A1* | 9/2015 | Calmettes ................ G08G 1/22 701/300 |
| 2015/0362581 A1* | 12/2015 | Friedman ............. G01S 13/767 455/456.1 |
| 2016/0362048 A1 | 12/2016 | Matthews et al. |
| 2017/0289864 A1* | 10/2017 | Narasimha ........ H04W 36/0027 |
| 2018/0267162 A1* | 9/2018 | Olson .................. G01S 13/765 |
| 2018/0376357 A1* | 12/2018 | Tavares Coutinho ....................... H04W 48/20 |
| 2019/0079540 A1* | 3/2019 | Yoon .................... G05D 1/0295 |

FOREIGN PATENT DOCUMENTS

| | | |
|---|---|---|
| WO | 2013187834 A1 | 12/2013 |
| WO | 2017167298 A1 | 10/2017 |
| WO | 2018073162 A1 | 4/2018 |

* cited by examiner

METHOD FOR CARRYING OUT DISTANCE MEASUREMENTS BETWEEN THE TRANSPORTATION VEHICLES OF A VEHICLE CONVOY AND TRANSPORTATION VEHICLE MODULE FOR USE IN THE METHOD AND TRANSPORTATION VEHICLE

PRIORITY CLAIM

This patent application claims priority to German Patent Application No. 10 2017 222 216.6, filed 7 Dec. 2017, the disclosure of which is incorporated herein by reference in its entirety.

SUMMARY

Illustrative embodiments relate to a method for carrying out distance measurements between transportation vehicles of a convoy. Furthermore, the disclosed embodiments relate to a transportation vehicle module for use with the method and a transportation vehicle.

BRIEF DESCRIPTION OF THE DRAWINGS

An exemplary embodiment is represented in the drawings and is described in detail below using the figures. In the figures.

DETAILED DESCRIPTION

Figure 1:
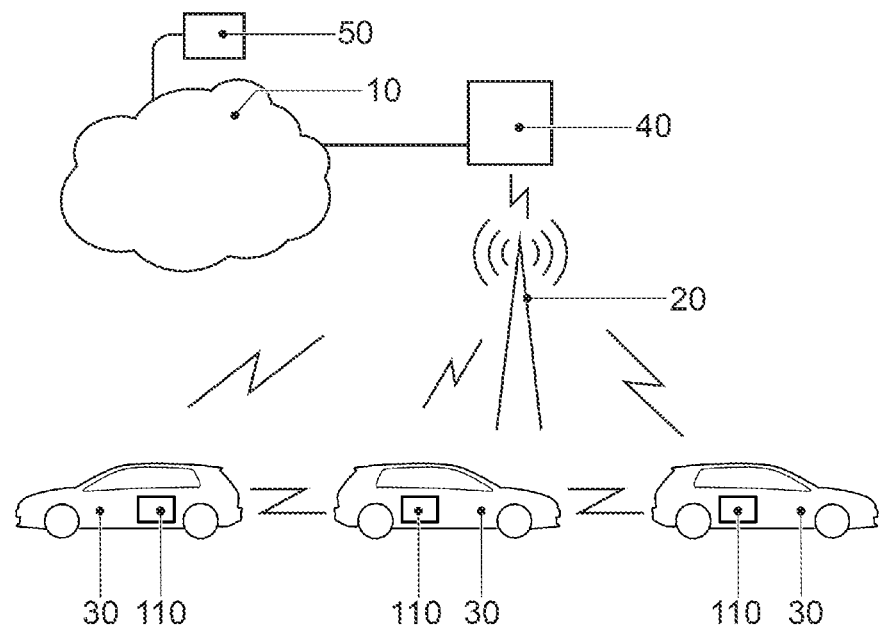
FIG. 1 shows transportation vehicle communications by mobile radio.

For the scenario of transportation vehicles fitted with radio communications modules that communicate directly with each other in public traffic, whether for cooperative or autonomous driving, or also for participation in mobile radio and connection to the Internet or supplying with other data services, high reliability for safety-critical applications is unrelenting or very important for the customer.

Ever more logistics companies are seeking technical solutions for fuel saving and increasing traffic safety for their operating trucks. Driving trucks (also utility transportation vehicles) in a convoy gives the possibility of reducing the fuel consumption by reducing the distances between the transportation vehicles that are driving together in a platoon. There is a direct relationship between the distance between the platoon transportation vehicles and reducing the fuel consumption and thus also the costs.

The challenge lies in minimizing the distance between the transportation vehicles in a platoon. This requires distance control with an accurate and reliable reference for the relative distance measurement between two transportation vehicles travelling one after the other in a platoon. The subject matter of this disclosure is the use of UWB transceivers to provide a reliable and accurate reference for the distance measurement between two transportation vehicles travelling one after the other in a platoon to optimally minimize the distance between the transportation vehicles.

Various technologies are currently used for relative distance measurement between transportation vehicles travelling one after the other:
RADAR
LIDAR
Stereo camera
GNSS-based distance measurement The above abbreviations mean: Radar Radio Detection And Ranging, Lidar Light Detection And Ranging and GNSS Global Navigation Satellite System.

The LIDAR and stereo camera-based relative distance measurements are dependent on the weather, such as, for example, on fog or thunderstorms, and require very high resolution for time of flight (TOF) measurement for short distances (<1 m), which increases the costs of the sensors. With conventional RADAR systems, a long dead time is necessary for the distance measurement for very short distances. This limits the frequency of the measurements, which is a drawback for distance control at very short distances. Here control must very often already be exercised at short time intervals. Moreover, interference by other RADAR equipment of other transportation vehicles cannot be excluded. In addition, RADAR, LIDAR and camera-based distance measurements are associated with relatively high implementation costs. According to the prior art of GNSS-based positioning (GPS, Galileo, GLONASS, Beidou, etc.), GNSS-based distance measurement is highly dependent on the environment. This is highly error-prone is because of multi-path propagations and non-line-of-sight (NLOS) conditions. Therefore, distance control for high-density platooning based on GNSS-based positioning is not reliable enough. It is also not accurate enough, since the accuracy of the position determination with GNSS-based systems is 1-3 m, even if certain correction signals are analyzed.

An example of a position determination system based on GPS signal analysis is also described in US2004/0193372 A1 including for the application of platooning. In this case, the GPS system is improved by combining it with BLUETOOTH®. By a BLUETOOTH® connection, position information is exchanged with a transportation vehicle of the platoon. In operation, the transportation vehicles communicate satellite data over the BLUETOOTH® connections. This enables the BLUETOOTH® radio connections to be used to reduce the number of satellites required for the GPS system without losing the accuracy of the measurements. Attention is drawn to the possibility of the use of UWB communications as an alternative to BLUETOOTH® communications.

A further example of such a system is described in US 2015/0269845 A1. Attention is drawn here to the need for highly accurate synchronization of the clocks in the transportation vehicles to measure the accurate position of the transportation vehicles by transition time measurements. As a solution, attention is drawn to the use of the highly accurate clocks in the GNSS systems.

The use of UWB transceivers for distance control for the platooning application is also known from a master's thesis of the Technical University of Eindhoven. The master's thesis of August 2016 is written by A. Srujan and has the title "Ultra-wide Band for Vehicle Platooning".

Transportation vehicle communications are however also possible in the area of mobile radio networks. With this technology however, the base station conveys the messages from transportation vehicle to transportation vehicle. That is the region in which communications take place in the so-called "Infrastructure Domain". For the upcoming mobile radio communications generation, direct transportation vehicle communications are also enabled. With LTE the facet is known as LTE-V, with the 5G initiative the facet is known as D2D.

Typical communications scenarios are safety scenarios, traffic efficiency scenarios and infotainment. For the safety area, the following scenarios are named: "Cooperative Forward Collision Warning", "Pre-Crash Sensing/Warning", "Hazardous Location Warning". In these areas, the transportation vehicles exchange information with each other such as position, direction and speed, also parameters such as size and weight. Further information that is transmitted relates to intent information, such as transportation vehicle intended to be overhauled, transportation vehicle turns left/right, etc., which are of interest for cooperative driving. In this case, sensor data are often transmitted. If there is a hazardous situation and the driver does not react, the car could decelerate automatically, so that an accident is prevented or at least the consequences of the unavoidable accident are kept as minor as possible.

In the traffic efficiency area, the following are mentioned: "Enhanced Route Guidance and Navigation", "Green-Light Optimal Speed Advisory", "V2V Merging Assistance" and "platooning". Platooning means intelligent convoy travel as an application, which is also known under the term "High Density Platooning". In this case, the distances between the transportation vehicles of the convoy, for example, trucks, are adapted to and controlled according to the respective traffic situation. This reduces the distance between the transportation vehicles of the convoy as much as possible to reduce energy consumption. For this purpose, messages must be constantly exchanged between the transportation vehicles of the convoy.

In the infotainment area, Internet access is in the foreground.

Currently, the following mobile radio technologies can be used for transportation vehicle communications: 3GPP-based UMTS, HSPA, LTE, and the upcoming 5G standards. For direct transportation vehicle communications, LTE-V and 5G D2D are mentioned.

Where data have to be periodically repeatedly transmitted, it is more efficient to reserve transmission resources for the transmission of the data and to assign the transmission resources to the transmitting station. A management unit, which is also known by the term scheduler, undertakes this task in the current mobile radio standard. The management unit is nowadays typically disposed in the mobile radio base station. In both LTE mobile communication systems, the base station is referred to in short as eNodeB, corresponding to "Evolved Node Basis".

In mobile radio, all activities of the user within a cell are orchestrated by the base station. The scheduler, as a rule a software component in the base station, notifies each subscriber at which point in time and at which frequencies of the transmission frame it can send certain data. The main task thereof thus consists of the correct assignment of the transmission resources to the different subscribers. As a result, collisions are avoided, the data traffic is controlled in both transmission directions from a subscriber (uplink) and to a subscriber (downlink) and more efficient access is enabled for a number of users. For direct transportation vehicle communications, the scheduler determines which frequency resource may be used at which point in time for the direct communications.

Disclosed embodiments further improve the UWB distance measurements for the "platooning" area. Here the focus is placed on the needs of the individual traffic. There are ever more transportation vehicles underway on the roads and the transportation vehicles are controlled cooperatively or autonomously. For this purpose, it is necessary to exchange ever more data between a mobile radio network and the transportation vehicles and also between the transportation vehicles. The number of other distance measurements is also drastically rising as a result. Mutual interference between the distance measurements of the different transportation vehicles should be avoided.

Disclosed embodiments provide a method for carrying out distance measurements between the transportation vehicles of a convoy, a transportation vehicle module, and a transportation vehicle.

With the disclosed method for carrying out distance measurements between the transportation vehicles of a convoy, with which the distances between the transportation vehicles of the convoy are automatically controlled, a UWB ranging method, corresponding to Ultra-Wide Band Ranging, is used for the distance measurement. The method is characterized in that coordination of the time sequence of the individual distance measurements between each two transportation vehicles of the convoy is carried out such that a planned time at which it should take place starting from the coordination event is assigned to each individual distance measurement. The coordination enables a reliable and accurate reference for the distance control for very short distances between the transportation vehicles.

In this case, it is beneficial if the coordination event corresponds to sending a distance measurement coordination message from a transportation vehicle of the convoy.

The transportation vehicles of the convoy may be equipped with communications methods or mechanisms for the vehicle-to-vehicle communications, referred to as V2V communications below, and the distance measurement coordination message is sent to the other transportation vehicles of the convoy via the communications methods or mechanisms for the V2V communications. When transmitting via the direct transportation vehicle communications, delays over intermediate stages are avoided.

In this context it is beneficial if the coordination of the individual distance measurements is carried out by the lead transportation vehicle of the convoy, in which the lead transportation vehicle sends the distance measurement coordination message to the other transportation vehicles of the convoy. With high-density platooning, typically the first transportation vehicle of the convoy carries out the task of the lead transportation vehicle. It also sends the corresponding commands if a braking process or acceleration process is to be initiated in a coordinated way.

Here it is beneficial if the distance measurement coordination message is sent to the other transportation vehicles of the convoy by broadcast or multicast. As a result, all transportation vehicles are supplied with the necessary information by sending a single distance measurement coordination message.

If the LTE-V mobile telecommunications system is used for the direct transportation vehicle communications, the distance measurement coordination message can be sent to the other transportation vehicles of the convoy by the LTE sidelink channel SL Broadcast Control Channel (SBCCH). Alternatively, a WLAN-P module could also be used for the direct transportation vehicle communications.

For coordination of the distance measurements in a single distance measurement coordination message, it is beneficial to incorporate the planned starting time points for the individual distance measurements between the transportation vehicles of the convoy in the message.

In addition, a reference time for synchronization of the clocks in the individual transportation vehicles of the convoy can be incorporated in the distance measurement coordination message. As a result, currently the synchronization of the clocks can always be carried out before the distance measurements start in the next cycle. This is at least beneficial if the distance measurements start directly after sending the distance measurement coordination message.

It is likewise beneficial if the starting time points for the individual distance measurements between the transportation vehicles of the convoy are coordinated so that the individual distance measurements are carried out in succession, wherein the individual distance measurements are carried out starting from the rear end of the convoy to the front or starting from the front end of the convoy to the rear. With this method, no individual distance measurements take place in parallel temporally. Thus, the measurements do not interfere with each other.

For practical implementation, it is beneficial if the method of UWB Ranging for distance measurement is carried out as Single-Sided Two-Way Ranging SS-TWR or Double-Sided Two-Way Ranging DS-TWR.

For a transportation vehicle module for use with the method, it is beneficial if the transportation vehicle module comprises a direct transportation vehicle communications module for the transmission and reception of messages and a distance control module. In this case, the distance control module and the direct transportation vehicle communications module are designed so that a distance measurement coordination message can be sent to the other transportation vehicles of the convoy by the direct transportation vehicle communications module. For the corresponding measures for the transportation vehicle module, the corresponding benefits as previously described in connection with the corresponding measures of the disclosed method apply. It is beneficial if the direct transportation vehicle communications module is a mobile radio communications module that is designed for direct transportation vehicle communications, for example, LTE-V.

For synchronization of the clocks of the transportation vehicles of the convoy, it is beneficial if the direct transportation vehicle communications module is designed so that it incorporates the current time of day of the clock of a GNSS module of the transportation vehicle module corresponding to the Global Navigation Satellite System in the distance measurement coordination message as a reference time.

The disclosed embodiments also concern a transportation vehicle in which a transportation vehicle module is installed.

The present description illustrates the principles of the disclosure. It will thus be understood that persons skilled in the art will be able to devise different arrangements that are not explicitly described here but that embody principles of the disclosure and that shall also be protected in the scope thereof.

FIG. 1 shows the principle of transportation vehicle communications by mobile radio. The transportation vehicles are provided with reference number 30.

The term transportation vehicle is understood as the collective term for motor vehicles, whether with combustion engines or electric motors, whether for bicycles with and without electric motors or other transportation vehicles operated by muscle power, be it for transportation vehicles with one, two, four or more wheels. Be it for motor cycles, passenger cars, trucks, buses, agricultural vehicles or construction machinery. The list is not definitive and also includes other vehicle categories.

The transportation vehicles in FIG. 1 are each equipped with a so-called onboard unit 110, which is used as a transmitting and receiving unit for communications in a mobile radio network. The onboard unit 110 is part of a mobile radio network subscriber station 30 in the sense of the disclosure. In the represented case, the mobile radio network subscriber stations are passenger cars. All messages from the transportation vehicles (uplink) and to the transportation vehicles (downlink) are either passed via a base station 20 that serves a mobile radio cell or exchanged directly between the transportation vehicles in the case of direct transportation vehicle communications (sidelink). If the transportation vehicles are disposed within the mobile radio cell, they are registered with the base station 20 or logged in. If they leave the mobile radio cell, they are handed over to the adjacent cell (handover) and accordingly registered or logged in to the base station 20. The base station 20 also provides access to the Internet, so that the transportation vehicles 30 or all other mobile radio subscribers in the mobile radio cell are provided with Internet data. For this purpose, the base station 20 is connected via the so-called S1 interface to the EPC 40 (Evolved Packet Core). A central computer 50 of a traffic control center that can control/monitor the traffic flow on the roads and that is accessible by the Internet 10 or another wide area network WAN is still available.

Such mobile radio technologies are standardized, and attention is drawn to the corresponding specifications of mobile radio standards in this respect. As a modern example of a mobile radio standard, attention is drawn to the 3GPP initiative and the LTE standard (Long Term Evolution). Many of the associated ETSI specifications are currently available in version 13. Examples are: ETSI TS 136 213 V13.0.0 (2016-05); Evolved Universal Terrestrial Radio Access (E-UTRA); physical layer procedures (3GPP TS 36.213 version 13.0.0 Release 13).

LTE primarily stands for high transmission rates and short reaction times. The increase in the transmission rate is achieved with LTE through better modulation methods, more flexible frequency utilization and greater channel bandwidths. According to the specification, mathematically and minus the overheads, a transmission rate of over 300 MBit/s in the downlink and 75 MBit/s in the uplink is currently achieved per 20-MHz band with LTE.

The transmission rate of LTE is essentially a function of the frequency range, the channel width, the distance from the base station 20 and the number of subscribers within the mobile radio cell. The more users use the bandwidth at the same time, the lower the transmission rate per subscriber falls.

For the downlink, the OFDMA technique (Orthogonal Frequency Division Multiple Access) is used. There the known multicarrier transmission technology OFDM (Orthogonal Frequency Division Multiplexing) is used, with which data symbols are modulated on the individual carrier by QPSK (Quadrature Phase-Shift Keying) or QAM (Quadrature Amplitude Modulation). With OFDMA, the available frequency band is divided into many narrow bands (channels). The bandwidth is used flexibly to extract the utmost transmission power from the frequencies.

Special algorithms choose suitable channels and in doing so take into account the influence of the environment. In this case, optionally only the carriers that are favorable for the user at his respective location are used for transmission.

The SC-FDMA technique (Single Carrier Frequency Division Multiple Access) is used for the uplink. This is a single-carrier access method which is otherwise very similar to OFDMA. SC-FDMA has smaller power fluctuations and makes simpler power amplifiers possible. This especially protects the batteries of mobile devices.

For sidelink communications, the resources of uplink communications are also used.

Using the vehicle-to-vehicle communications, which is carried out over sidelink communications, new transportation vehicle-relevant applications can be implemented. As an example, the already described "platooning" is mentioned. In this case, several or even many transportation vehicles are controlled in a coordinated way using a technical control system, so that they can drive one after the other at very short distances without adversely affecting traffic safety. In trucks, this results in a considerable reduction in fuel consumption and a considerable reduction in greenhouse gases. The application is, however, safety-critical. It must always be guaranteed that the transportation vehicles of the convoy can stop. The braking process is coordinated so that all transportation vehicles brake at the same time to avoid problems with load slipping up to collisions. For this purpose, vehicle-to-vehicle communications are used. Here the accuracy of the distance measurement is important in a special way. Vehicle-to-vehicle communications could alternatively also be implemented by another radio technology, for example, by WLAN P.

According to the disclosed embodiments, the newer distance measurement with UWB transceivers (TRX) is used. The use of UWB distance measurement alone is already beneficial in terms of failure probability. The UWB signals are very broadband and are radiated with low spectral power, i.e., with a low peak-to-average power ratio PAPR. Therefore, they hardly interfere with the other narrowband vehicle-to-vehicle communications.

A disclosed embodiment consists of planning the different distance measurements between the platoon participants against time by the lead platoon transportation vehicle, frequently also referred to as the platoon leader, to avoid interference between the UWB transceivers. As a rule, the lead platoon transportation vehicle is the first transportation vehicle of the convoy, behind which the other convoy transportation vehicles drive at a short distance.

How the time planning is carried out and how the individual distance measurements are carried out is described accurately below.

Figure 2:
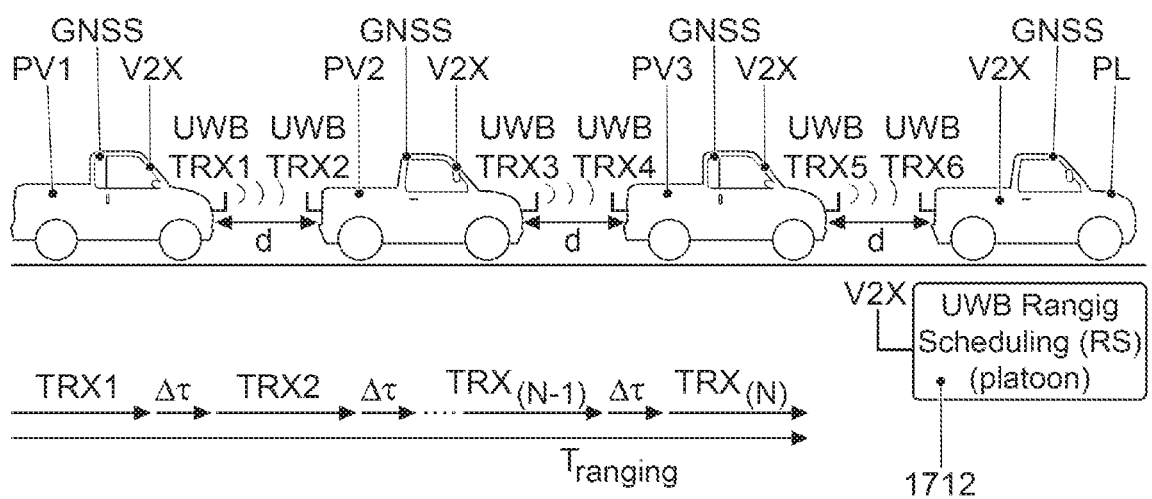
FIG. 2 shows the basic process of UWB distance measurement between the transportation vehicles of the platoon.

In FIG. 2, a convoy with four transportation vehicles is represented. These are utility transportation vehicles. Typically, trucks of suitable length that band together to travel over a distance together to save energy and protect the environment. The lead platoon transportation vehicle is referred to as PL, corresponding to "platoon leader". The following platoon transportation vehicles are referred to as PV3 to PV1. The designator GNSS is intended to signify that the transportation vehicles are equipped with satellite navigation. The designator V2X indicates that the transportation vehicles are equipped with on-board communications methods or mechanisms for direct transportation vehicle communications. Furthermore, it is shown that the transportation vehicles are also fitted with UWB transceivers. In this case, the transportation vehicles are each populated with 2 UWB transceivers, one on the front of the transportation vehicle and one on the rear of the transportation vehicle. The transportation vehicles are also fitted with a platoon coordination unit 1712. The function is only activated in the lead platoon transportation vehicle PL, however.

The distance measurement operates between two transportation vehicles of the convoy so that a transportation vehicle transmits a UWB signal of short duration to the transportation vehicle ahead. A time stamp is incorporated in the message to be transmitted, which indicates the transmission time point according to the clock running in the transportation vehicle sending the message. The transportation vehicle ahead receives the UWB message and sends back an acknowledgement message, wherein it incorporates the time stamp for the transmission of the acknowledgement message in the acknowledgement message. The procedure is thus the same as with "round trip time measurement" in communications networks. The first transportation vehicle receives the acknowledgement message and analyses it. The transition time of the UWB signal across the air interface can be calculated using the time stamps of both messages. This gives the distance between both transportation vehicles by the known formula $S=c*t_{prop}$ with c equal to the speed of light in air and $t_{prop}$ equal to the measured transition time. A prerequisite for the measurement method is that the clocks in the participating transportation vehicles are highly accurately synchronized.

Further details of the distance measurement method are known from the already mentioned master's thesis of A. Srujan. The so-called double-sided two-way ranging method DS-TWR is recommended there since it has benefits in terms of accuracy. In this case, the distance measurement is carried out twice in succession. With the second measurement, the transportation vehicle ahead transmits the UWB signal and the first transportation vehicle responds thereto. For further details on the distance measurement method, reference is also expressly made to the master's thesis with respect to the detailed disclosure.

The time synchronization for the time planning of the distance measurements between the transportation vehicles of the convoy is carried out by the highly accurate GNSS time reference. The time reference is approx. accurate to 1 μs, which is adequate for the time planning of the transmission time points for the different distance measurements in the convoy. Each distance measurement is carried out within a measurement duration TRX1 to TRXN, which is short enough, for example, 1 ms. At a speed of 100 km/h, the transportation vehicle only moves 28 cm in the time of 1 ms. Therefore, the distance control can take place very finely and highly accurately if the measurement only lasts a millisecond. The parameter Δτ refers to the time interval between two measurements and is about 1 μs. The measurements cannot be coordinated more accurately since the clocks are only synchronized accurate to 1 μs. However, in any case the coherence time in the transmission channel for the UWB distance measurements must be awaited so that interference cannot occur. However, this lies in the nanosecond region. For 4 transportation vehicles in the convoy the total duration of all distance measurements in the convoy "Tranging" is then:

$$T{ranging}=3*1\text{ ms}+3*0.001\text{ μs}=3.003\text{ ms}.$$

This ensures the avoidance of mutual interference between the UWB transceivers.

The accuracy of the distance measurement with such UWB distance measurement systems is 10 cm in line of sight conditions LOS. This also applies if the UWB transceivers are positioned very close to each other (≤1 m distance). As shown in FIG. 2, the UWB antennas are mounted on the front and rear of each transportation vehicle. If the distance d of the transportation vehicles is controlled to 1 m and less, they come very close together. Because of the high accuracy of the UWB distance measurement, sufficiently accurate distance control is ensured for use in the convoy.

Figure 3:
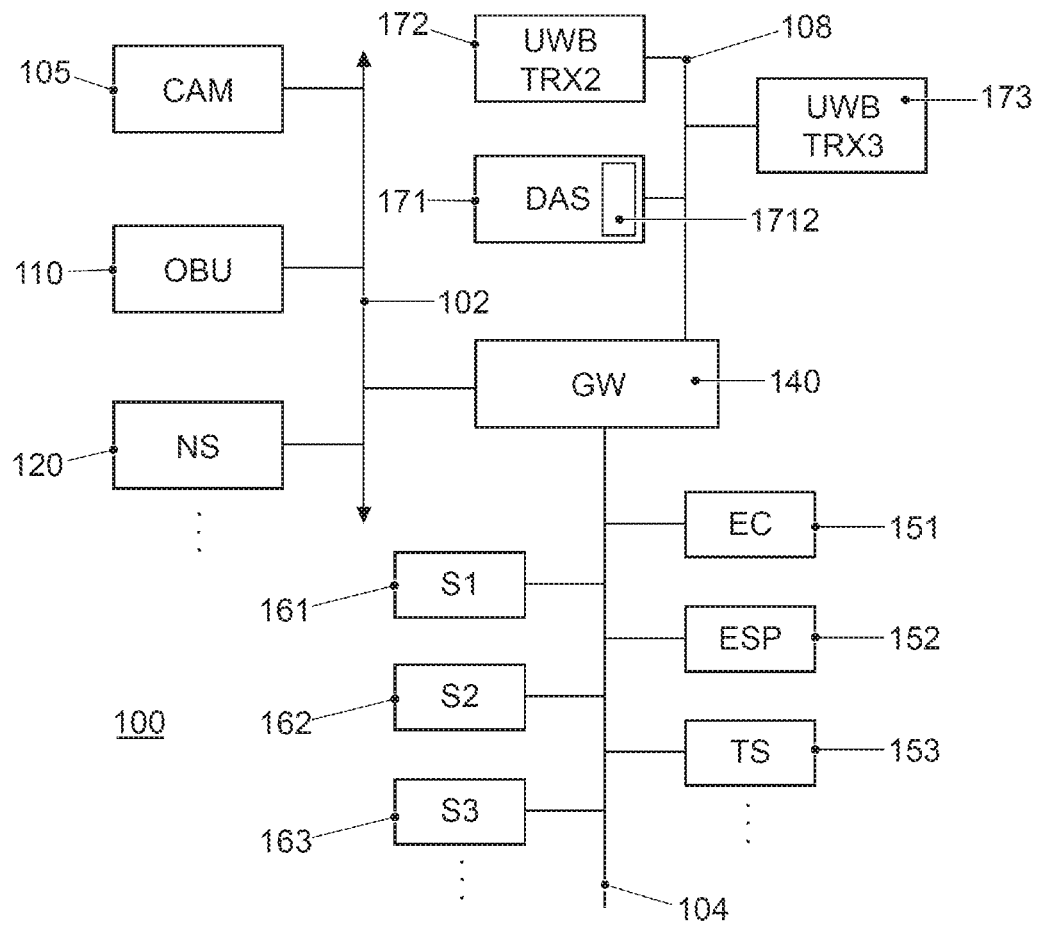
FIG. 3 shows a block diagram for the vehicle electronics of a transportation vehicle.

FIG. 3 shows the typical structure of transportation vehicle electronics 100 of a modern transportation vehicle 30. The reference number 151 refers to an engine control unit. Reference number 152 corresponds to an ESP control unit and reference number 153 refers to a gearbox control unit. Further control units such as an airbag control unit, etc. can be present in the transportation vehicle. The networking of such control units is typically carried out with the CAN bus system (Controller Area Network) 104 which is standardized as an ISO standard, ISO 11898. Because different sensors are installed in the transportation vehicle and are no longer only connected to single control units, such sensor data are also transmitted over the bus system 104 to the individual control units. Examples of sensors in the transportation vehicle are wheel revolution rate sensors, steering angle rate sensors, acceleration sensors, rate of turn sensors, tire pressure sensors, distance sensors etc. The different sensors with which the transportation vehicle is equipped are denoted in FIG. 3 with the reference numbers 161, 162, 163.

The modern transportation vehicle can however also comprise further components such as video cameras, for example, as a rear view camera or as a driver monitoring camera or even as a front camera for observing traffic events.

For some years, driver assistance systems have been offered that detect the transportation vehicle surroundings with radar, lidar or video sensing, form an internal representation of the driving situation by interpretation of the sensor data and building on the information carry out increasingly sophisticated functions with information and warnings to the driver up to controlled interventions into the control of the transportation vehicle. Thus, for example, longitudinal control can be automatically carried out for a large part of the time on well-structured roads, such as motorways, by an ACC System (Adaptive Cruise Control) equipped with lidar sensing and/or radar sensing. In FIG. 3, as an example a driver assistance system is provided with the reference character 171. For the case under consideration here of the implementation of distance control for high density platooning, a UWB distance measuring system is installed in the transportation vehicle. For this purpose, two UWB transceivers 172, 173 are installed per transportation vehicle. In this exemplary embodiment, unit 1712, which coordinates the distance control, is provided in the control unit of the driver assistance system 171. Alternatively, it could be implemented in a separate control unit or a different control unit. The components 171, 172 and 173 are networked by a further bus system 108. The CAN bus system can also be used for this purpose.

Yet more electronic devices are also disposed in the transportation vehicle. The devices are disposed more in the region of the passenger compartment and are often also operated by the driver. Examples are a user interface device (not represented) with which the driver can select driving modes but can also operate classic components. This includes gear selection and also direction indicator control, windscreen wiper control, light control, etc.

A navigation system 120, which is also installed in the region of the cockpit, is often distinguished from this. The route, which is displayed on a map, can be represented on a display in the cockpit. Reference number 110 refers to yet another onboard unit. The onboard unit 110 corresponds to a communications module, by which the transportation vehicle mobile data can be received and transmitted. As described, this can be a mobile radio communications module, for example, according to the LTE and LTE-V standard or a WLAN-P module.

The items of equipment in the passenger compartment are also networked together by a bus system, which is referred by the reference number 102. It can, for example, be the high speed CAN bus system according to the ISO 11898-2 standard, but here in the version for data transmission with a higher data rate between infotainment devices. Alternatively, Ethernet is also used for the networking of components in the transportation vehicle. The gateway 140 is provided for transmitting the transportation vehicle-relevant sensor data via the communications module 110 to another transportation vehicle or to another central computer. The gateway is connected to all three different bus systems 102, 104 and 108. The gateway 140 is designed to convert the data that it receives via the CAN bus 104 so that the data can be converted into the transmission format of the high speed CAN bus 102, so that the data can be distributed in the packets specified therein. For forwarding the data externally, the communications module 110 is equipped to receive the data packets and again convert them into the transmission format of the corresponding communications standard to be used. In another disclosed embodiment, the platoon coordination module 1712 can be integrated within the onboard unit 110. Then the traffic from and to the UWB transceivers 172 and 173 must be routed via the gateway 140.

Figure 5:
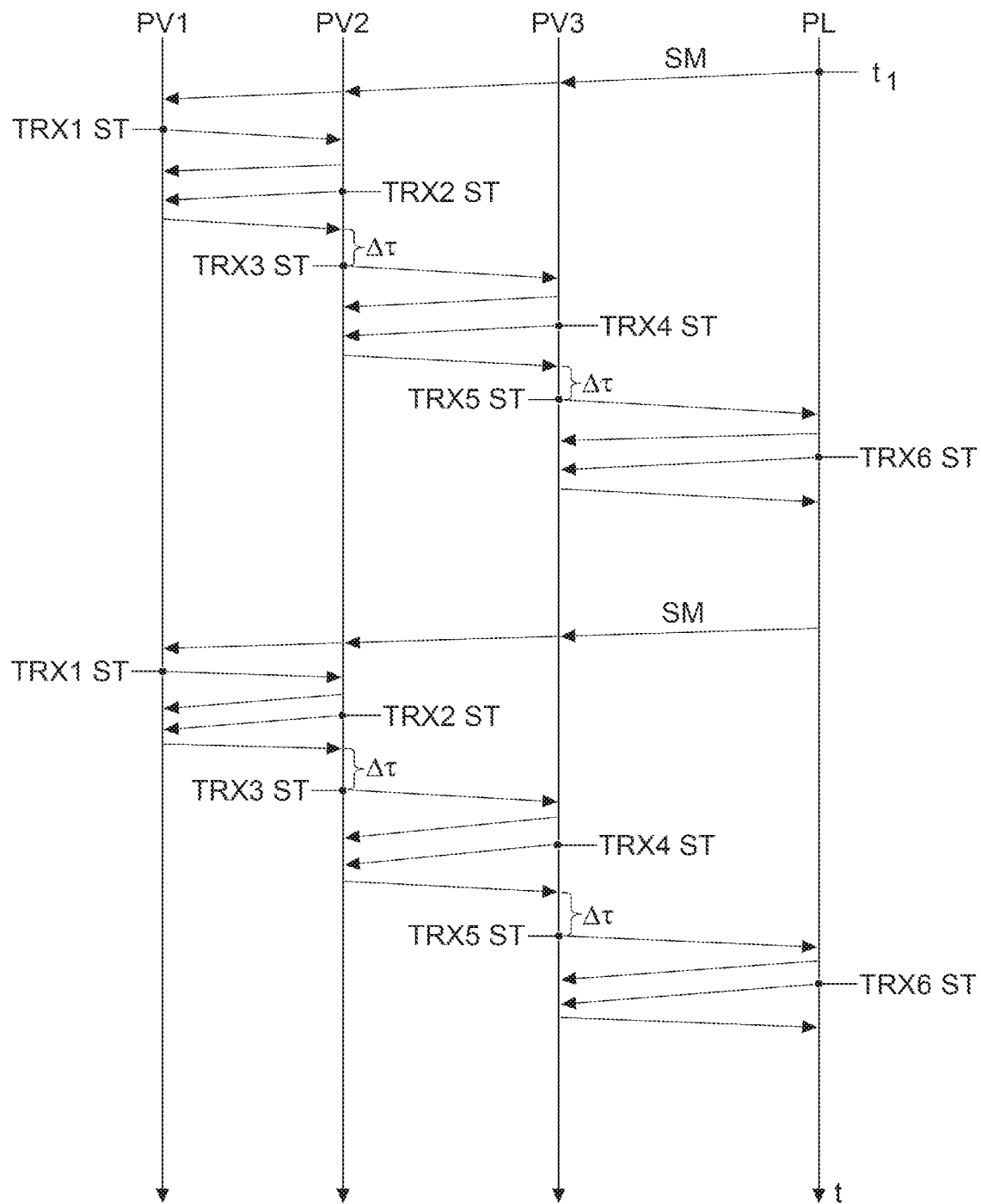
FIG. 5 shows the timing of the UWB distance measurement between the transportation vehicles of the platoon.

FIG. 5 shows the flow of communications for the application of the aforementioned "platooning". Typically, platoons with up to 10 transportation vehicles are formed. With longer platoons, problems would arise for the rest of the traffic, moreover the cost of coordination of the transportation vehicles would be greater.

The lead platoon transportation vehicle PL communicates with the other platoon transportation vehicles PV1 to PV3 by the LTE-V vehicle-to-vehicle communications, for which reason the transportation vehicles are indeed equipped with the onboard communications unit 110. The transportation vehicles each register with the lead platoon transportation vehicle PL if they wish to join the platoon. In the following it is assumed that the transportation vehicles PV1 to PV3 have registered with the lead platoon transportation vehicle PL.

Figure 4:
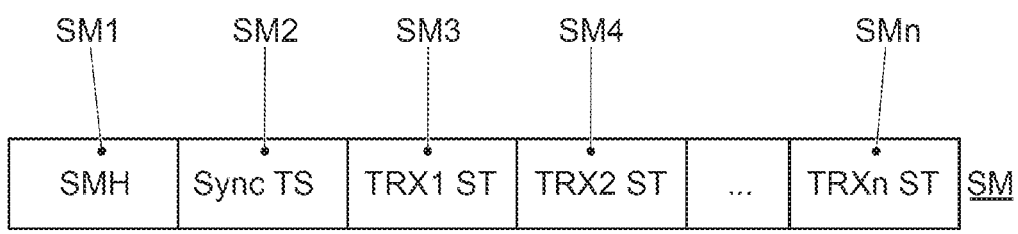
FIG. 4 shows the message format for the setup of the distance measurement for the individual platoon participants by a management unit for the platoon.

For coordination of the distance measurements, the following process now takes place. At the point in time t1, the lead platoon transportation vehicle PL sends a distance measurement coordination message SM to the transportation vehicles of the platoon. The message has the format shown in FIG. 4. The field SM1 contains the head part SMH of the coordination message. Using the head part, the subscribers detect the message type. The field SM2 contains a time stamp Sync TS. The time stamp is used for synchronization of the clocks in the individual subscribers. The lead platoon transportation vehicle PL thus delivers the current state of the own clock thereof in the message. Thereafter the fields SM3 to SMn contain the specified times TRX1 ST to TRXn ST at which the individual UWB transceivers 172, 173 in the platoon transportation vehicles are to carry out the distance measurement. With the distance measurement coordination message SM, the "scheduling" of the distance measurements in the platoon takes place. As shown in the example of FIG. 2, the first distance measurement TRX1 for the last transportation vehicle PV1 in the platoon is planned. The last distance measurement between the lead platoon transportation vehicle and the following transportation vehicle PV3 is planned for TRX6. The planning is carried out so that all measurements take place at different points in time, so that no measurements run in parallel in time. As a result, mutual interference of UWB distance measurements is avoided from the start. The distance measurement coordination message SM is transmitted by broadcast by the sidelink channel SL Broadcast Control Channel (SBCCH). Alternatively, it can be transmitted to the platoon transportation vehicles by WLAN p or by the normal mobile communications with uplink and downlink transmission directions. All platoon transportation vehicles analyze the message and configure themselves according to the times specified for them.

At the point in time TRX1 ST, the first measurement starts. The transceiver TRX1 of the transportation vehicle PV1 inserts the time stamp for the transmission time point into the UWB distance measurement message. The transportation vehicle PV2 receives the message and sends a reply back to the transportation vehicle PV1 without delay. In the reply, which also contains the information of the received message, it additionally incorporates the reception time point of the previous message and the transmission time point of the reply message. At the planned point in time TRX2 ST, the transportation vehicle PV2 then sends the UWB distance measurement message thereof. The transportation vehicle PV1 responds to the message accordingly. As described in the aforementioned master's thesis, the subscribers can accurately determine the distance between the transportation vehicles from the obtained measurement results according to the DS-TWR method. The time points for the measurements between the other transportation vehicles are accurate specified in FIG. 5.

The control commands derived from the relevant distance values are transmitted to the control units engine control unit 151 and ESP control unit 152 in each transportation vehicle by the gateway 140. Then the distance is thus either reduced or increased, depending on what is necessary according to the control algorithm running in the driver assistance control unit 171.

In FIG. 5, two successive measurement cycles for the distance measurements are represented. Further cycles could follow to increase accuracy. The second cycle starts again with transmitting a distance measurement coordination message. Further cycles could follow to increase accuracy. If the individual measurements always follow each other at the shortest intervals according to the DS-TWR method, then inclusion of the starting time points for the second measurements in the distance measurement coordination message can be dispensed with, i.e., for TRX2 ST, TRX4 ST and TRX6 ST.

It should be understood that the proposed method and the associated devices can be implemented in different forms of hardware, software, firmware, special processors or a combination thereof. Special processors can comprise application specific integrated circuits (ASICs), reduced instruction set computers (RISC) and/or field programmable gate arrays (FPGAs). The proposed method and the device may be implemented as a combination of hardware and software. The software may be installed as a user program on a program memory device. Typically, it is a machine based on a computer platform that comprises hardware, such as, for example, one or more central processing units (CPU), a direct access memory (RAM) and one or more input/output (I/O) interface(s). moreover, an operating system is typically installed on the computer platform. The various processes and functions that have been described here can be part of the application program or a part that is executed by the operating system.

The disclosure is not limited to the exemplary embodiments described here. There is room for different adaptations and modifications that would be considered by the person skilled in the art based on his specialist knowledge and the disclosure.

REFERENCE CHARACTER LIST

10 Internet
20 base station
30 mobile radio network subscriber station
40 Evolved Packet Core EPC
50 central computer
100 transportation vehicle electronics block diagram
102 Ethernet bus
105 camera
104 CAN bus
108 CAN bus
110 onboard unit
120 navigation system
140 gateway
151 motor control unit
152 ESP control unit
153 gearbox control unit
161 sensor 1
162 sensor 2
163 sensor 3
171 driver assistance control unit
172 $1^{st}$ UWB transceiver
173 $2^{nd}$ UWB transceiver
1712 platoon coordination unit
PV1 platoon transportation vehicle
PV2 platoon transportation vehicle
PV3 platoon transportation vehicle
PL lead platoon transportation vehicle
SM distance measurement coordination message
SM1-SMn message fields

The invention claimed is:

1. A transportation vehicle module for use with a method for carrying out distance measurements between transportation vehicles of a convoy, the transportation vehicle module comprising:
   a mobile radio communications module for transmission and reception of messages via a mobile telecommunications system; and
   a distance control module, wherein the distance control module and the mobile radio communications module cooperate to formulate and send a distance measurement coordination message to other transportation vehicles of the convoy by the mobile radio network communications module,
   wherein the distances between the transportation vehicles of the convoy are controlled automatically based on the distance measurement coordination message,
   wherein an ultra-wide band (UWB) ranging method is used by the distance control module for distance measurement, and
   wherein coordination of a time sequence of individual distance measurements between each two transportation vehicles of the convoy is performed such that a planned starting time is assigned to each individual distance measurement at which that individual distance measurement is to be performed starting from a coordination event and performed such that the planned starting times are in succession to one another based on a position of each transportation vehicle of the convoy.

2. The transportation vehicle module of claim 1, wherein the distance control module sends each planned starting time point for the individual distance measurements between the transportation vehicles of the convoy to the mobile radio communications module and the mobile radio communications module incorporates the planned starting times for the individual distance measurements between the transportation vehicles of the convoy in the distance measurement coordination message.

3. The transportation vehicle module of claim 2, wherein the mobile radio communications module utilizes a reference time for synchronization of the clocks in the individual transportation vehicles of the convoy to determine in the distance measurement coordination message.

4. The transportation vehicle module of claim 3, wherein the mobile radio communications module incorporates the current time of day of the clock of a module corresponding to a Global Navigation Satellite System (GNSS) into formulation of the distance measurement coordination message as a reference time.

5. A transportation vehicle comprising a transportation vehicle module for use with a method for carrying out distance measurements between transportation vehicles of a convoy, the transportation vehicle module comprising:
   a mobile radio communications module for transmission and reception of messages via a mobile telecommunications system; and
   a distance control module, wherein the distance control module and the mobile radio communications module cooperate to formulate and send a distance measurement coordination message to other transportation vehicles of the convoy by the mobile radio network communications module,
   wherein the distances between the transportation vehicles of the convoy are controlled automatically based on the distance measurement coordination message,
   wherein an ultra-wide band (UWB) ranging method corresponding to ultra-wide band ranging is used by the distance control module for distance measurement,
   wherein coordination of a time sequence of individual distance measurements between each two transportation vehicles of the convoy is performed such that a planned starting time is assigned to each individual distance measurement at which that individual distance measurement is to be performed starting from a coordination event and performed such that the planned starting times are in succession to one another based on a position of each transportation vehicle of the convoy, and
   wherein the transportation vehicle module is installed in the transportation vehicle.

6. The transportation vehicle of claim 5, wherein the distance control module sends each planned starting time point for the individual distance measurements between the transportation vehicles of the convoy to the mobile radio communications module and the mobile radio communications module incorporates the planned starting times for the individual distance measurements between the transportation vehicles of the convoy in the distance measurement coordination message.

7. The transportation vehicle of claim 6, wherein the mobile radio communications module utilizes a reference time for synchronization of the clocks in the individual transportation vehicles of the convoy to determine in the distance measurement coordination message.

8. The transportation vehicle of claim 7, wherein the mobile radio communications module incorporates the current time of day of the clock of a module corresponding to a Global Navigation Satellite System (GNSS) into formulation of the distance measurement coordination message as a reference time.

9. A method for carrying out distance measurements between transportation vehicles of a convoy in which the distances between the transportation vehicles of the convoy are controlled automatically, wherein an ultra-wide band (UWB) ranging method is used for distance measurement, wherein coordination of a time sequence of individual distance measurements between each two transportation vehicles of the convoy is carried out so a planned time is assigned to each individual distance measurement at which that individual distance measurement is to be carried out starting from a coordination event and performed such that the planned starting times are in succession to one another based on a position of each transportation vehicle of the convoy.

10. The method of claim 9, wherein the coordination event corresponds to the transmission of a distance measurement coordination message from a control station or a transportation vehicle of the convoy.

11. The method of claim 10, wherein the transportation vehicles of the convoy are equipped for vehicle-to-vehicle communications (V2V communications), and the distance measurement coordination message is transmitted to the other transportation vehicles of the convoy by V2V communications.

12. The method of claim 10, wherein the coordination of the individual distance measurements is carried out by a lead transportation vehicle of the convoy, in which the lead transportation vehicle sends the distance measurement coordination message to the other transportation vehicles of the convoy.

13. The method of claim 12, wherein the distance measurement coordination message to the other transportation vehicles of the convoy is sent to the other transportation vehicles of the convoy by broadcast or multicast.

14. The method of claim 13, wherein the distance measurement coordination message is sent to the other transportation vehicles of the convoy by the LTE sidelink channel SL Broadcast Control Channel (SBCCH), corresponding to the long term evolution standard family, or by communications in a WLAN p network arranged for direct transportation vehicle communications, corresponding to a wireless LAN.

15. The method of claim 12, wherein the planned starting time points for the individual distance measurements between the transportation vehicles of the convoy are incorporated in the distance measurement coordination message.

16. The method of claim 15, wherein a reference time for synchronization of the clocks in the individual transportation vehicles of the convoy is incorporated in the distance measurement coordination message.

17. The method of claim 9, wherein the planned starting times for the individual distance measurements between the transportation vehicles of the convoy are coordinated so the individual distance measurements are carried out in succession, wherein the individual distance measurements are carried out starting from the rear end of the convoy to the front or starting from the front end of the convoy toward the rear.

18. The method of claim 9, wherein the method of UWB ranging for distance measurement is single-sided two-way ranging SS-TWR or double-sided two-way ranging DS-TWR.

* * * * *